April 15, 1947.　　　G. H. ALLINGTON　　　2,418,861
ENGINE SHIPPING CASE
Filed Oct. 1, 1943　　　2 Sheets-Sheet 1

Inventor:
George H. Allington
By McCanna, Wintercorn
& Morsbach  Attys.

April 15, 1947.  G. H. ALLINGTON  2,418,861
ENGINE SHIPPING CASE
Filed Oct. 1, 1943  2 Sheets-Sheet 2
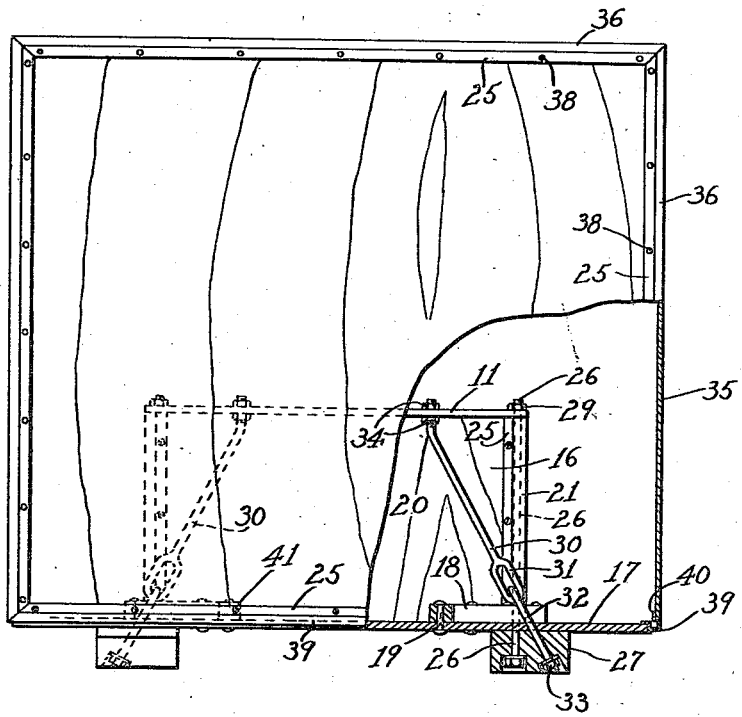
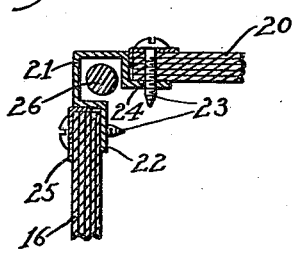
Inventor:
George H. Allington
By McCanna, Wintercorn
& Morsbach Attys.

Patented Apr. 15, 1947

2,418,861

UNITED STATES PATENT OFFICE 2,418,861

ENGINE SHIPPING CASE

George H. Allington, Rockford, Ill., assignor, by mesne assignments, to United Aircraft Corporation, East Hartford, Conn., a corporation of Delaware Application October 1, 1943, Serial No. 504,573

17 Claims. (Cl. 206—46)

1

This invention relates to an improved shipping case especially designed and adapted for use in the shipment of radial type aircraft engines.

The principal object of my invention is to provide a shipping case in which a mounting plate resting on a housing secured to the case-bottom is rigidly secured to the case-bottom more or less independently of said housing by tie-rods that extend diagonally from the four corners of the plate downwardly to the case-bottom and are anchored to the case-bottom in the skids which are secured to the underside of the case-bottom, whereby to positively prevent displacement of the mounting plate radially in any direction, while holding the same firmly in a fixed spaced relationship to the case-bottom, the loads imposed upon the tie-rods being transmitted to the skids and, therefore, distributed over a wide area of the case-bottom, so that there is no danger of the plywood case-bottom being splintered in the shipment of an engine.

Another object of my invention is to provide a shipping case of the kind mentioned in which the spacer housing between the case-bottom and mounting plate is of plywood construction for lightness and strength and has the plywood panels forming the four sides thereof interconnected by hollow corner posts of sheet metal construction and of substantially square cross-section, and through-bolts are provided extending lengthwise through the corner posts and through the case-bottom and skids to prevent displacement of the mounting plate and housing with respect to the case-bottom more or less independently of the tie-rods, the loads imposed on the through-bolts being transmitted to the skids and thereby distributed over a wide area of the case-bottom to eliminate danger of splintering.

The invention is illustrated in the accompanying drawings, in which—

Fig. 3 is a view similar to Fig. 1 but taken from another side of the case, and

Fig. 4 is a horizontal sectional detail of a corner portion of the housing under the mounting plate.

The same reference numerals are applied to corresponding parts throughout the views.

Figure 1:
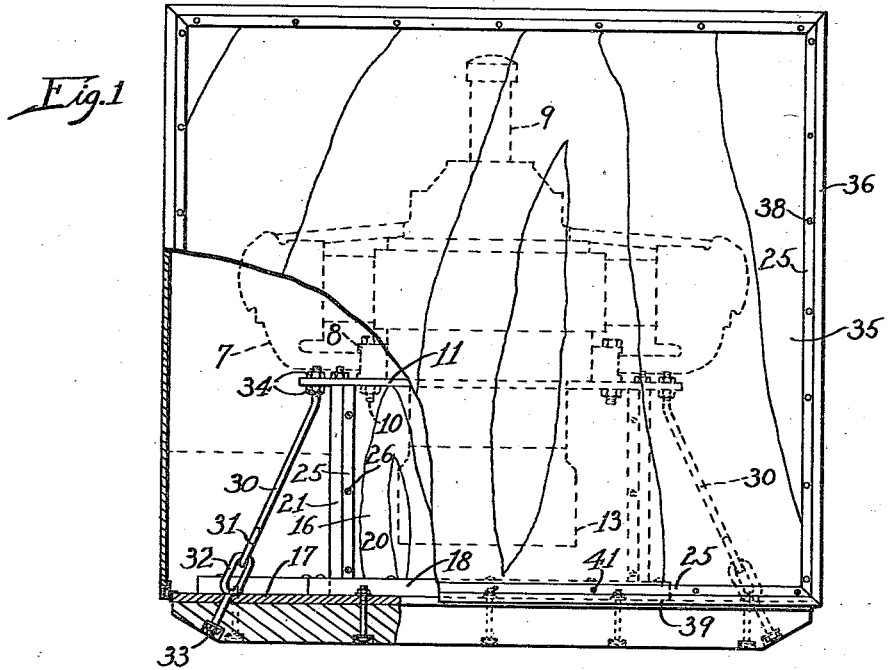
Figure 1 is a view partly in side elevation and partly in vertical longitudinal section of an engine shipping case made in accordance with my invention.
Figure 2:
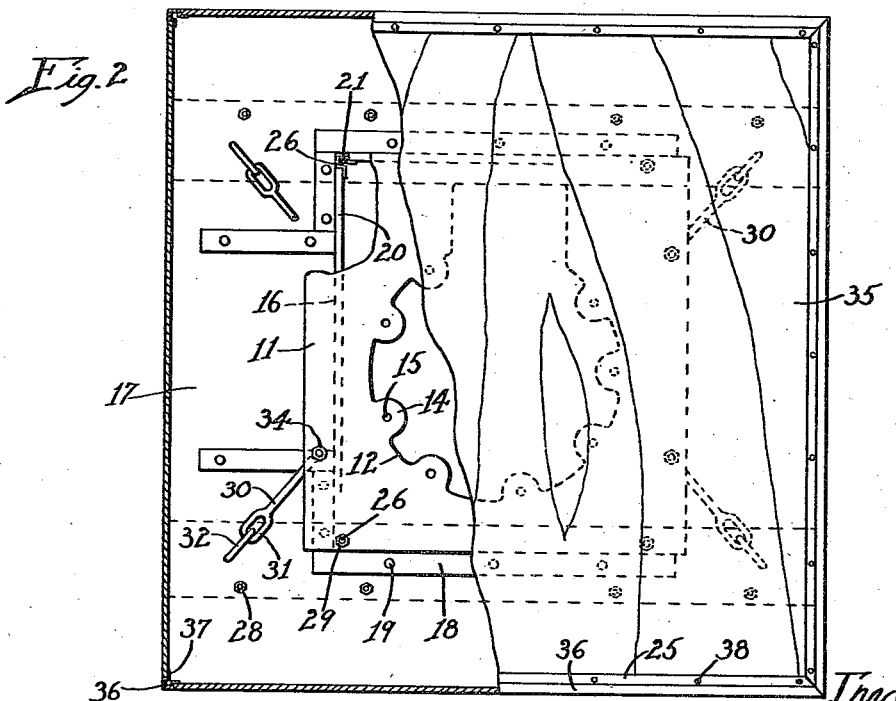
Fig. 2 is another view of the case partly in plan and partly in horizontal section.

A radial type aircraft engine is indicated in dotted lines at 7 in Fig. 1, having the usual bosses 8 in circumferentially spaced relation around the longitudinal axis of the engine and its propeller shaft 9 for use ultimately in the mounting of the engine in the aircraft for which it is designed. Bolts 10 are entered in these bosses to mount the engine in the shipping case on the mounting plate 11, provided in accordance with my invention. The mounting plate 11, which is preferably of metal, although not necessarily so, is of rectangular form, and has a generally circular opening 12 provided therein for extension of the rear portion 13 of the engine downwardly through the plate when the engine is fastened to the lugs 14 that project radially inwardly in circumferentially spaced relation around the opening 12. The holes 15 provided in these lugs for reception of the bolts 10 are located in the same relationship as the bolt holes on the mounting plate on the aircraft fuselage and are of the same size, so that the bolts 10 can be of the same size as those used in the ultimate mounting of the engine on the aircraft, and the engine is accordingly supported substantially as well on the plate 11 in the shipping case as when it is mounted on the aircraft.

A rectangular spacer housing 16 is supported on the case-bottom 17 and has the mounting plate 11 supported thereon. Strips 18 riveted or otherwise suitably secured to the case-bottom 17, as indicated at 19, enclose the bottom portion of the housing 16 to prevent lateral displacement of the housing in any direction. This housing is preferably made of four plywood panels 20 for lightness and strength as well as economy, and the four panels are fastened together by hollow corner posts 21 of sheet metal construction, in the manner illustrated in Fig. 4. The posts 21 are substantially square in cross-section, and have flanges 22 projecting therefrom at right angles on two adjacent side walls thereof to which the panels 20 are fastened by means of screws 23. These screws are preferably of the self-tapping type and enter holes 24 provided therefor in the flanges 22. Sheet metal strips 25 of angular cross-section are preferably placed over the edge portions of the panels 20 and have the screws 23 entered through holes therein and registering holes in the plywood panels, thus protecting the panels against danger of splintering. The screws are, of course, tightened so as to clamp the plywood panels firmly onto the flanges. In some cases the corners of the mounting plate 11 are cut off diagonally, but, as herein shown, long through-bolts 26 are preferably provided, extending through holes in the corners of the mounting plate 11 and downwardly through the posts 21 and through registering holes in the case-bottom 17 and wooden skids 27 that are provided in parallel relation to one another on the underside of the case-bottom 17. These skids are bolted to the case-bottom, as indicated at 28, and are provided for protection of the case in shipment and also to provide a good place for connecting a hoist to the case in the handling thereof. The bolts 26 are preferably entered upwardly through the skids, and nuts 29 are preferably threaded on the projecting upper ends of the bolts and when tightened serve to clamp the mounting plate 11 securely onto the housing 16 at the four corners.

Brass rods 30 are provided extending diagonally downwardly from the four corners of the mounting plate 11 to the case-bottom 17, where eyes 31 are provided for connection of these brass rods with eye-bolts 32 that extend diagonally downwardly through holes in the case-bottom 17 and registering holes in the skids 27. Nuts 33 are provided on the lower ends of the eye-bolts 32 for anchorage thereof in the skids 27, and other nuts 34 are provided on the upper ends of the brass rods 30, where these rods pass through holes provided therefor in the mounting plate 11. When the upper nuts 34 have been tightened to the extent desired for proper tensioning of the brass rods 30, the lower nuts 34 can be tightened to serve as lock nuts, and the mounting plate 11 is accordingly firmly held against displacement with respect to the case-bottom 17 in any direction. The bolts 26 previously described will assume a considerable portion of the load in the event the case is rolled over, end over end, in the handling thereof during shipment, and, of course, these bolts combined with the holding power of the brass rods 30 give enormous strength and rigidity for the engine mounting. In fact, the brass rods 30, as indicated before, afford sufficient strength and rigidity by themselves to permit elimination of the bolts 26, especially where lighter engines are being shipped. The locating framework 18 on the case-bottom 17 within which the housing 16 fits adds further considerable strength and rigidity to the engine mounting. The skids 27 serve to distribute the loads imposed thereon by the bolts 26 and 32 over such a wide area of the case-bottom 17 that there is no danger of splintering the same when plywood is used for this part, as herein indicated.

The entire case is preferably made of plywood; that is to say, not only the case-bottom 17 but also the case-cover 35. Sheet metal corners posts 36 of square cross-section are provided for the case-cover, having flanges 37 thereon for the fastening of the edges of the plywood panels thereto, in the same general manner as indicated in Fig. 4, reinforcing metal strips 25 of angular cross-section being placed over the edges of the plywood panels, and rivets 38 being passed through registering holes in these strips and plywood and flanges for permanent connection of the parts. The strips 25 afford the desired amount of bearing surface to distribute the load sufficiently to prevent splintering of the plywood panels. The case-bottom 17 has sheet metal strips 39 of square cross-section riveted onto the four edges thereof in the same manner as the corner posts 36 are fastened to the five walls of the case-cover. The upwardly projecting flanges 40 on these strips 39, like the flanges 22 on the corner posts 21 of the housing 16, are adapted to receive self-tapping screws 41. In that way the lower edges of the case-cover can be fastened detachably to the case-bottom using reinforcing metal strips 25 of angular cross-section for protection of the plywood against splintering, and the case-cover can be removed readily when the shipping case arrives at its destination.

It is believed the foregoing description conveys a good understanding of the objects and advantages of my invention. The appended claims have been drawn to cover all legitimate modifications and adaptations.

I claim:

1. In an engine shipping case, comprising a rectangular case-bottom and a rectangular, box-like case-cover detachably securable to the case-bottom to enclose an engine supported on the case-bottom, engine supporting means comprising a mounting plate of smaller dimensions than the case bottom disposed substantially centrally and in parallel relation to the case-bottom having an opening provided therein for projection therethrough of a portion of an engine fastened to the mounting plate, a housing of smaller dimensions than the plate and disposed in concentric relation thereto rigid with the case-bottom and adapted to enclose the projecting portion of the engine and support the mounting plate in spaced relation to the case-bottom, skids secured to the underside of the case-bottom, and through-bolts extending from the mounting plate through the housing and through the case-bottom and skids to secure the mounting plate rigidly onto the housing and secure the mounting plate and housing in rigid relationship to the case-bottom and skids.

2. An engine shipping case as set forth in claim 1, including an enclosing framework for the lower portion of said housing rigidly secured to the case-bottom to prevent lateral displacement of the housing with respect to the case-bottom.

3. An engine shipping case as set forth in claim 1, including bracing means extending diagonally between the case-bottom and mounting plate at circumferentially spaced points with respect to the mounting plate and within the rectangle defined by the cover and in vertical planes in transverse relation to one another to prevent displacement of the mounting plate relative to the case-bottom in any direction.

4. An engine shipping case as set forth in claim 1, including brace rods extending diagonally between the case-bottom and mounting plate at circumferentially spaced points with respect to the mounting plate and within the rectangle defined by the cover and in vertical planes in transverse relation to one another to prevent displacement of the mounting plate relative to the case-bottom in any direction, said brace rods having anchorage in the skids through the case-bottom.

5. In an engine shipping case, comprising a rectangular case-bottom and a rectangular, box-like case-cover detachably securable to the case-bottom to enclose an engine supported on the case-bottom, engine supporting means comprising a mounting plate of smaller dimensions than the case bottom disposed substantially centrally and in parallel relation to the case-bottom having an opening provided therein for projection therethrough of a portion of an engine fastened to the mounting plate, a housing of smaller dimensions than the plate and disposed in concentric relation thereto rigid with the case-bottom and adapted to enclose the projecting portion of the engine and support the mounting plate in spaced relation to the case-bottom, skids secured to the underside of the case-bottom, and brace rods secured to the marginal portion of the mounting plate at circumferentially spaced points and extending downwardly diagonally and anchored in the skids through the case-bottom within the rectangle defined by the cover, whereby to secure the mounting plate and housing against displacement with respect to the case-bottom and hold the mounting plate against displacement in any direction relative to the case-bottom on said housing.

6. An engine shipping case as set forth in claim 5, including an enclosing framework for the lower portion of said housing rigidly secured to the case-bottom to prevent lateral displacement of the housing with respect to the case-bottom.

7. In an engine shipping case, comprising a rectangular case-bottom and a rectangular, box-like case-cover detachably securable to the case-bottom to enclose an engine supported on the case-bottom, engine supporting means comprising a mounting plate of smaller dimensions than the case bottom disposed substantially centrally and in parallel relation to the case-bottom having an opening provided therein for projection therethrough of a portion of an engine fastened to the mounting plate, a housing of smaller dimensions than the plate and disposed in concentric relation thereto rigid with the case-bottom and adapted to enclose the projecting portion of the engine and support the mounting plate in spaced relation to the case-bottom, and brace rods secured to the marginal portion of the mounting plate at circumferentially spaced points and extending downwardly diagonally and secured to the case-bottom within the rectangle defined by the cover, whereby to secure the mounting plate and housing against displacement with respect to the case-bottom and hold the mounting plate against displacement in any direction relative to the case-bottom on said housing.

8. An engine shipping case as set forth in claim 7, including an enclosing framework for the lower portion of said housing rigidly secured to the case-bottom to prevent lateral displacement of the housing with respect to the case-bottom.

9. In an engine shipping case, comprising a rectangular case-bottom and a rectangular, box-like case-cover detachably securable to the case-bottom to enclose an engine supported on the case-bottom, engine supporting means comprising a mounting plate of generally rectangular form and smaller in dimensions than the case-bottom disposed substantially centrally and in parallel relation to the case-bottom having an opening provided therein for projection therethrough of a portion of an engine fastened to the mounting plate, a housing of generally rectangular form and smaller outside dimensions than the mounting plate rigid with the case-bottom adapted to enclose the projecting portion of the engine and support the mounting plate in spaced relation to the case-bottom, skids secured to the underside of the case-bottom, and brace rods secured to the marginal portion of the mounting plate outside the housing at circumferentially spaced points and extending downwardly diagonally and anchored in the skids through the case-bottom within the rectangle defined by the cover, said rods being disposed in vertical planes extending substantially diagonally with respect to the mounting plate at the four corners thereof, whereby to secure the mounting plate and housing agent against displacement with respect to the case-bottom and hold the mounting plate against displacement in any direction relative to the case-bottom on said housing.

10. An engine shipping case as set forth in claim 9, including an enclosing framework for the lower portion of said housing rigidly secured to the case-bottom to prevent lateral displacement of the housing with respect to the case-bottom.

11. In an engine shipping case, comprising a rectangular case-bottom and a case-cover detachably securable to the case-bottom to enclose an engine supported on the case-bottom, engine supporting means comprising a mounting plate of generally rectangular form and smaller in dimensions than the case-bottom disposed substantially centrally and in parallel relation to the case-bottom having an opening provided therein for projection therethrough of a portion of an engine fastened to the mounting plate, a housing of generally rectangular form and smaller outside dimensions than the mounting plate rigid with the case-bottom adapted to enclose the projecting portion of the engine and support the mounting plate in spaced relation to the case-bottom, and brace rods secured to the marginal portion of the mounting plate outside the housing at circumferentially spaced points and extending downwardly diagonally and secured to the case-bottom within the rectangle defined by the cover, said rods being disposed in vertical planes extending substantially diagonally with respect to the mounting plate at the four corners thereof, whereby to secure the mounting plate and housing against displacement with respect to the case-bottom and hold the mounting plate against displacement in any direction relative to the case-bottom on said housing.

12. An engine shipping case as set forth in claim 11, including an enclosing framework for the lower portion of said housing rigidly secured to the case-bottom to prevent lateral displacement of the housing with respect to the case-bottom.

13. In an engine shipping case, comprising a case-bottom and a case-cover detachably securable to the case-bottom to enclose an engine supported on the case-bottom, engine supporting means comprising a mounting plate disposed substantially in parallel relation to the case-bottom having an opening provided therein for projection therethrough of a portion of an engine fastened to the mounting plate, a substantially rectangular housing rigid with the case-bottom adapted to enclose the projecting portion of the engine and support the mounting plate in spaced relation to the case-bottom, the four side walls of said housing being of non-metallic sheet material and disposed substantially vertically with respect to the case-bottom and interconnected at the four corners of the housing by hollow sheet metal corner posts which are disposed substantially vertically with respect to the case-bottom, skids secured to the underside of the case-bottom, and substantially vertical through-bolts extending from the mounting plate through the corner posts of the housing and through the case-bottom and skids to secure the mounting plate rigidly onto the housing and secure the mounting plate and housing in rigid relation to the case-bottom and skids.

14. An engine shipping case as set forth in claim 13, including an enclosing framework for the lower portion of said housing rigidly secured to the case-bottom to prevent lateral displacement of the housing with respect to the case-bottom.

15. An engine shipping case as set forth in claim 13, including bracing means extending diagonally between the case-bottom and mounting plate at circumferentially spaced points with respect to the mounting plate and in vertical planes in transverse relation to one another to prevent displacement of the mounting plate relative to the case-bottom in any direction.

16. An engine shipping case as set forth in claim 13, including brace rods extending diagonally between the case-bottom and mounting plate at circumferentially spaced points with respect to the mounting plate and in vertical planes in transverse relation to one another to prevent displacement of the mounting plate relative to the case-bottom in any direction, said brace rods having anchorage in the skids through the case-bottom.

17. In an engine shipping case, comprising a base and a case-cover detachably securable to the base to enclose an engine supported on the base, engine supporting means comprising a mounting plate of smaller dimensions than the base disposed substantially centrally and in parallel relation to the base having an opening provided therein for projection therethrough of a portion of an engine, means on said mounting plate for attachment thereto of an engine, a housing of smaller dimensions than the base supporting said mounting plate in spaced relation to the base and adapted to enclose the projected portion of an engine mounted on said plate, means securing the housing in rigid relationship to the base including a framework substantially enclosing the lower portion of said housing rigidly secured to the base and preventing lateral displacement of the housing with respect to the base, and cross pieces secured to the underside of said base.

GEORGE H. ALLINGTON.

REFERENCES CITED

The following references are of record in the file of this patent:

UNITED STATES PATENTS

| Number | Name | Date |
|---|---|---|
| 1,913,649 | White | June 13, 1933 |
| 2,147,798 | Pilcher | Feb. 21, 1939 |
| 1,483,648 | Whitworth et al. | Feb. 12, 1924 |